United States Patent [19]
Walsh

[11] Patent Number: 5,726,706
[45] Date of Patent: Mar. 10, 1998

[54] TUBULAR LIGHTING SECURITY SYSTEM

[75] Inventor: Terrence C. Walsh, Coto de Caza, Calif.

[73] Assignee: Tivoli Industries, Inc., Santa Ana, Calif.

[21] Appl. No.: 491,808

[22] Filed: Jun. 19, 1995

[51] Int. Cl.[6] .................................................. H04N 7/18
[52] U.S. Cl. ................................... 348/151; 348/373
[58] Field of Search ........................... 348/143, 150, 348/151, 157, 159, 373; 273/309; H04N 7/18

[56] References Cited

U.S. PATENT DOCUMENTS

| | | | |
|---|---|---|---|
| 3,935,380 | 1/1976 | Coutta | 348/150 |
| 4,120,004 | 10/1978 | Coutta | 348/150 |
| 4,438,988 | 3/1984 | Santora | 384/454 |
| 4,745,479 | 5/1988 | Waehner | 348/588 |
| 4,751,627 | 6/1988 | Usher | 362/421 |
| 4,777,527 | 10/1988 | Camps et al. | 348/183 |
| 5,077,640 | 12/1991 | Butler | 362/11 |
| 5,105,349 | 4/1992 | Falls et al. | 362/405 |
| 5,258,837 | 11/1993 | Gormley | 348/441 |

OTHER PUBLICATIONS

"The WAT-202 Coler CCD Camera", Watec, The CCD Camera Leader 1992 (Month Not Avail.).
Wettig, (Derwent Abstract of DE 1939213), Dec. 1977.
Mitsubishi, (Derwent Abstract of JP 5199438), Aug. 1993.
Behles, (Derwent Abstract of CH 589991), Jul. 1977.

*Primary Examiner*—Bryan S. Tung
*Attorney, Agent, or Firm*—Price, Gess & Ubell

[57] ABSTRACT

An elongate tubular fixture mounts a plurality of rotatable assemblies above a plurality of respective apertures in the tubular fixture. The rotatable assemblies position a number of lamps and one or more concealed miniature surveillance cameras to observe a gaming table or other surface of interest.

3 Claims, 4 Drawing Sheets

5,726,706

TUBULAR LIGHTING SECURITY SYSTEM

BACKGROUND OF THE INVENTION

1. Field of the Invention

The present invention relates generally to security systems and pertains, more specifically, to a combination tubular lighting/security system for providing functional and decorative lighting while, at the same time, mounting surveillance apparatus in a concealed and unobtrusive manner.

2. Description of Related Art

In U.S. Pat. No. 4,751,627, incorporated herein by reference, a tubular lighting system having considerable utility and aesthetic appeal is disclosed. That lighting system includes a plurality of elongate tubular members joined together in a selected array, each tubular member carrying lamp assembles therein which are aimed laterally through apertures in the wall of the tubular member. The lamp assemblies are captured within the tubular members by coupling means which enable rotation of the lamp assemblies for aiming purposes, as well as selective insertion and withdrawal of the lamp assemblies through corresponding apertures, for example, for removal and replacement of expended lamps.

Today there is increasing interest in security systems, particularly in the gaming and casino industry. Various complicated video monitoring systems have been installed in various gaming establishments. Such systems typically involve exposed cameras positioned at some distance from the gaming tables or gaming area. Because of the large amounts of money involved, there is a continuing need for improved security systems in gaming establishments and other environments.

OBJECTS AND SUMMARY OF THE INVENTION

It is therefore an object of the invention to improve security systems; and

It is another object of the invention to provide a relatively concealed video monitoring apparatus of compact and unobtrusive nature.

Accordingly, the inventor has conceived of a lighting fixture including means for illuminating a surface of interest, as well as containing concealed miniature surveillance camera means for observing activity on the surface. In a preferred embodiment the lighting fixture includes an elongate tubular member mounting a plurality of rotatable assemblies and shaped to overlay a gaming table or other gaming apparatus. At least one rotatable assembly comprises a lamp assembly, while at least a second comprises a camera means concealed within the unobtrusive lamp-type apparatus which may be positioned at an appropriate angle to closely monitor action on the gaming table.

Thus, the invention provides a functional and decorative lighting assembly which in itself provides no suggestion of, and, in fact, distracts patrons from the thought of, surveillance equipment being present, thus promoting a more congenial, but still secure, gaming environment.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a readily-producible and particularly attractive lighting surveillance apparatus.

Figure 1:
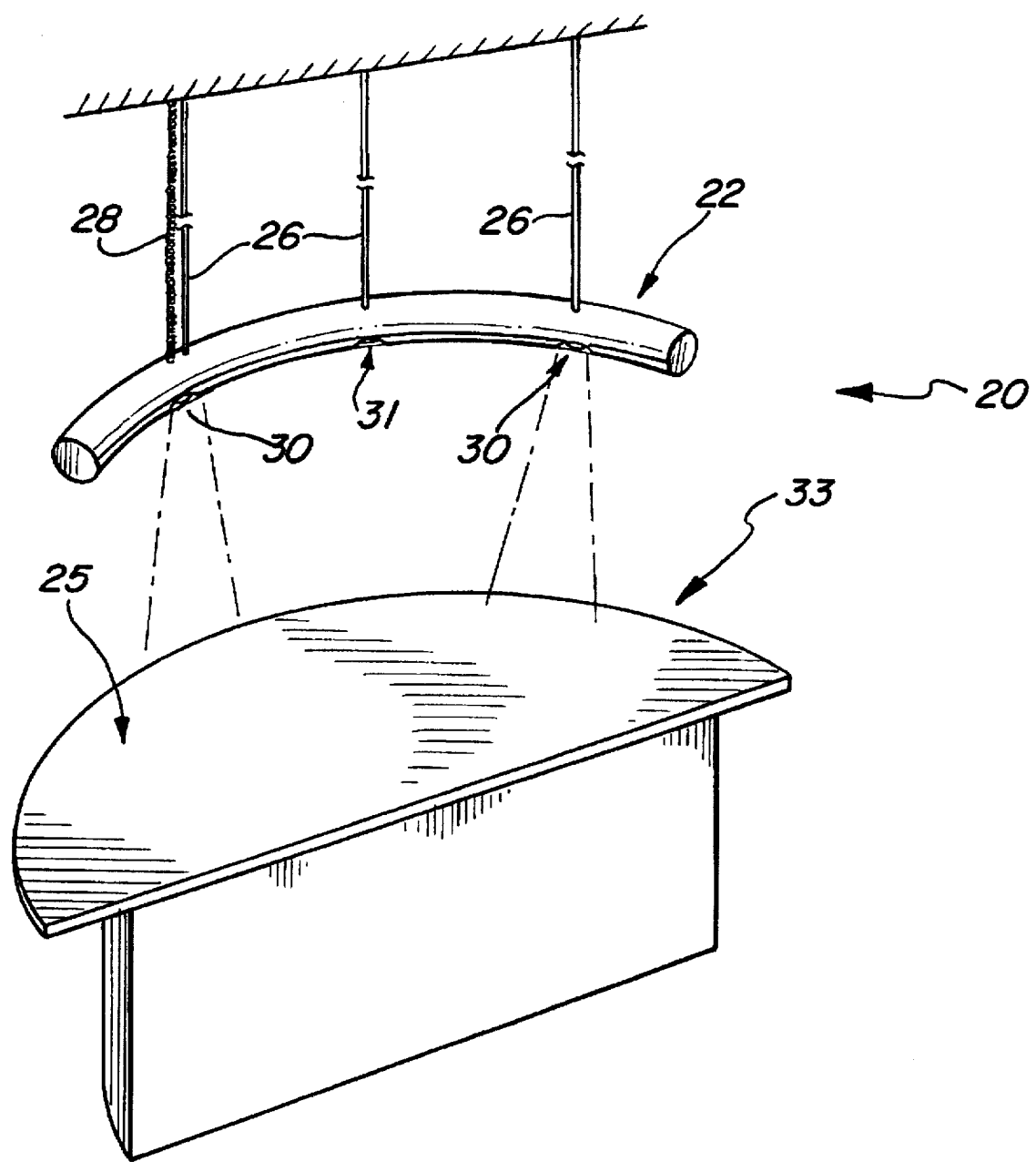
FIG. 1 is a perspective view of a tubular lighting security gaming apparatus installation according to the preferred embodiment.

Referring now to the drawings, and especially to FIG. 1 thereof, a lighting surveillance gaming apparatus installation 20 is shown as including a lighting surveillance fixture 22 suspended from an adjacent structure, illustrated as a ceiling 24, over a gaming apparatus 25. Suspension cables or rods 26 are attached to the ceiling 24 and drop downwardly to support lighting fixture 22. Power cabling 28 also extends downwardly from the ceiling 24 to the lighting surveillance fixture 22 to supply power to the fixture 22. The lighting surveillance fixture 22 includes a plurality of lamp assemblies 30 and one or more surveillance pods 31 mounted within a tubular member 32. The lamp assemblies 30 are aimed so as to distribute light to the gaming apparatus 25 and adjacent vicinity.

The tubular member 32 may comprise a single tube, as shown, or an array of tubes joined together at adjacent ends. As illustrated in FIG. 1, the tubular member 32 is generally shaped to conform to and thus overlay the gaming apparatus. In FIG. 1, the gaming apparatus 25 is illustrated as a gaming table having an arced playing surface 33 and the overlying tubular member 22 is similarly arced. Various shapes and positioning of tubular lighting surveillance fixtures can be employed, however, without departing from the scope and spirit of the invention as set forth in the appended claims.

Figure 2:
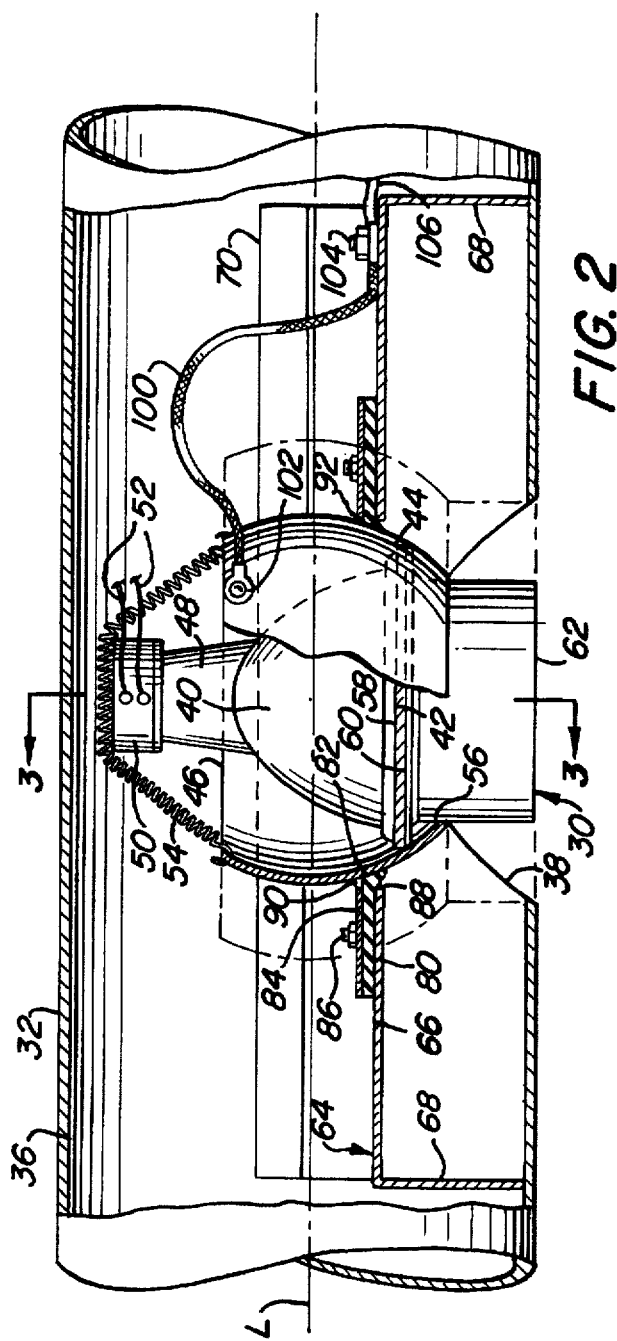
FIG. 2 is an enlarged fragmentary view of a portion of the lighting surveillance apparatus, broken away to show internal details.
Figure 3:
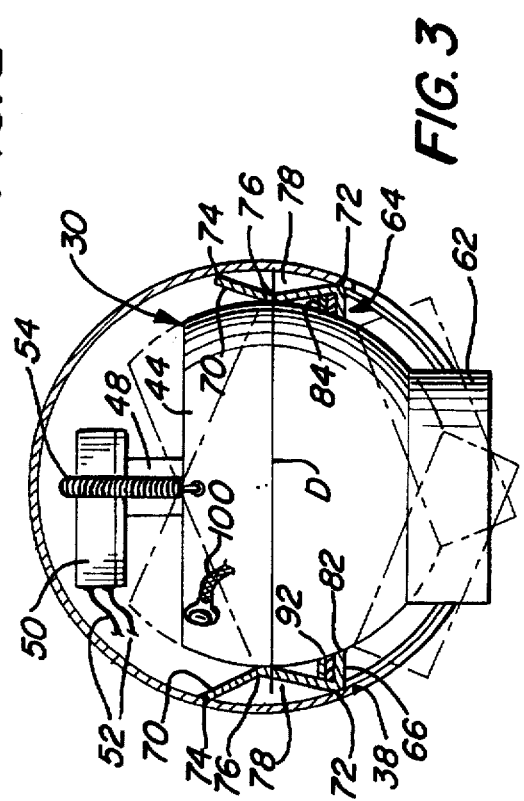
FIG. 3 is a cross-sectional view taken along line 3—3 of FIG. 2.

Turning now to FIGS. 2 and 3, the tubular member 32 includes an elongate generally cylindrical wall 36 extending along a longitudinal axis L which is oriented in a horizontal direction. An aperture 38 extends through the wall 36 at the location of each lamp assembly 30 or surveillance pod 31. Each lamp assembly 30 includes a lamp 40, here shown in the form of a commercially-available high-intensity, low-voltage lamp, designated in the trade as an MR-16 lamp, having a sealed envelope which includes within the envelope the filament of the lamp and a reflector for directing light through the face 42 of the lamp 40. Lamp 40 is placed within a lamp holder shown in the form of a semispherical housing 44 having an opening 46 at the top thereof through which the neck 48 of the lamp 40 extends to be connected to a lamp socket 50 which, in turn, is connected to leads 52. Leads 52 are a part of a power distribution circuit which includes a transformer (not shown) located elsewhere in the tubular member 32, and connected between the leads 52 and the power cable 28. A lamp-retaining spring 54 is passed over lamp socket 50 and biases the lamp socket 50 and lamp 40 downwardly toward a lower opening 56 in the housing 44. Interposed between the face 42 of lamp 40 and the lower opening 56 are a transparent plate 58, preferably constructed of safety glass, and the flange 60 of a cylindrical snoot 62 which extends downwardly in a lateral direction to pass through the aperture 38 and reduces glare from the lamp 40.

Each lamp assembly 30 is mounted within the interior of the tubular member 32 by means of a carrier member 64 placed within the interior of tubular member 32 and including a longitudinally-extending platform 66 having depending end webs 68 and opposite side rails 70. Preferably, the carrier member 64 is constructed of a resiliently flexible sheet material, such as sheet steel, and the side rails 70 are unitary with the platform 66. The platform 66 rests upon a wall 36 of the tubular member 32 below the diameter D of the tubular member 32, at 72, and the side rails 70 are bent upwardly and extend outwardly to be resiliently biased against wall 36 of tubular member 32, at 74 above the diameter D. In this manner, side rails 70 serve as securing means by which carrier member 64 is secured against altitudinal upward and downward movement and resists longitudinal movement along the length of tubular member 32. In addition, side rails 70 are bent inwardly at 76 to establish passages 78 which serve as wire ways for wires (not shown) which distribute power to lamps 40, or to any other electrically-operated device mounted in the tube 32 or in the vicinity of installation 20.

Figure 4:
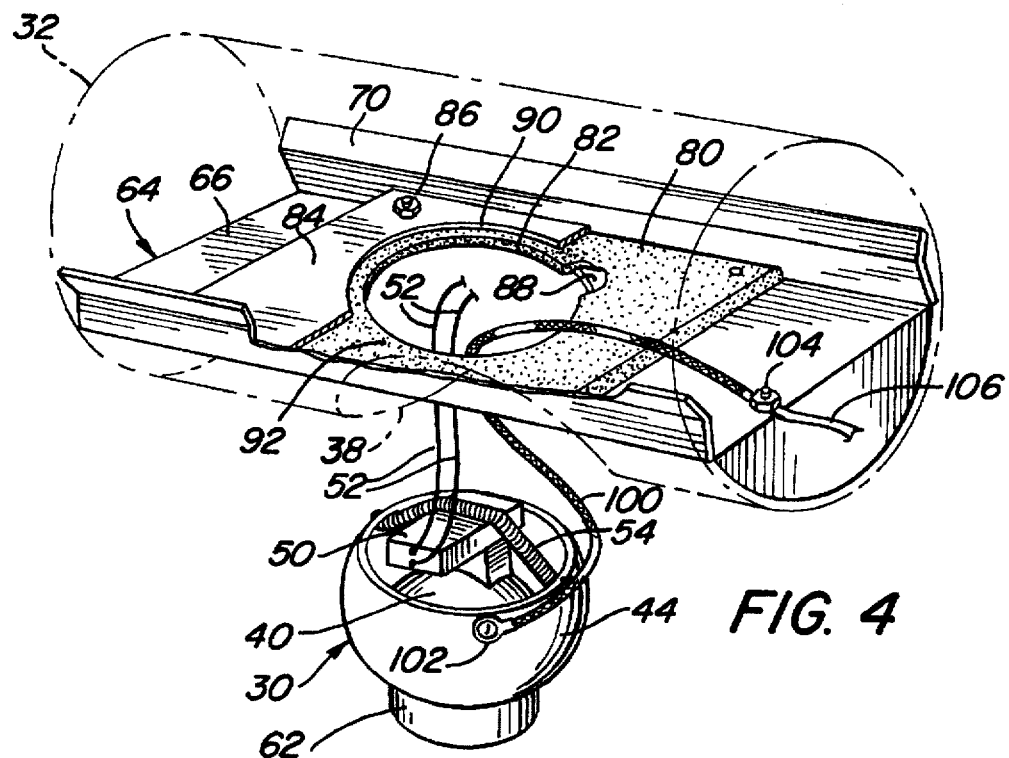
FIG. 4 is a perspective view of internal component parts of the lighting surveillance apparatus.

Referring now to FIG. 4, as well as to FIGS. 2 and 3, each lamp assembly 30 is coupled to carrier member 64 by means of a resilient retaining member 80, shown in the form of a sheet of resilient material, such as an elastomeric material, having a resiliently dilatable opening 82. The elastomeric material preferably is a silicone rubber which provides the required degree of heat resistance while maintaining the desired resiliency. A resilient retaining member 80 is clamped between platform 66 and a securing plate 84, by means of fasteners 86. The platform 66 and securing plate 84 have respective apertures 88, 90, and both apertures 88 and 90 are coaxial with opening 82 and have a diameter greater than the diameter of opening 82 so that a resilient lip 92 surrounds opening 82 in the resilient retaining member 80. The diameter of opening 82 is less than the diameter of housing 44 of the lamp holder so that the housing 44 is gripped within lip 92, as shown in FIGS. 2 and 3, with snoot 62 projecting downwardly into aperture 38.

For aiming purposes, each lamp assembly 30 is movable relative to tubular member 32 in two different modes. First, the housing 44 may be swiveled within resilient retaining member 80 by grasping snoot 62 and rotating housing 44 relative to resilient retaining member 80, and platform 66. The frictional coupling between the lip 92 and the housing 44 maintains the housing 44 at a desired aimed position, some of which positions are shown in phantom in FIG. 3. Second, the housing 44 may be moved longitudinally relative to tubular member 32 by sliding the carrier member 64 longitudinally toward either end of tubular member 32, within the limits set by the engagement of snoot 62 with the perimeter of aperture 38, as shown in phantom in FIG. 2. The resiliency of side rails 70, while resisting inadvertent longitudinal movement of carrier member 64, will permit such deliberate sliding movement. End webs 68, which move with carrier member 64, serve as light shrouds.

Should it become necessary to remove and replace an expended lamp 40, all that is required is that snoot 62 be grasped and pulled downwardly through aperture 38. Opening 82 will be dilated to pass housing 44 downwardly through the resilient retaining member 80 to be released from the carrier member 64. Aperture 38 is large enough to permit the passage of the housing 44 through the aperture 38 and out of the tubular member 32, as shown in FIG. 4. For safety purposes, housing 44 is tethered to carrier member 64 by a cable 100 fastened to housing 44 at 102 and to carrier member 64 at 104, so that lamp assembly 30 cannot inadvertently fall from the lighting fixture 22. The cable 100 is a conductor and is connected at 104 to a ground wire 106. When the lamp assembly 30 is removed from tubular member 32, the lamp retaining spring 54 and lamp socket 50 are accessible for removal and replacement of lamp 40. Once the lamp 40 is replaced, the lamp assembly 30 merely is reinserted through aperture 38, opening 82 being dilated to pass housing 44 upwardly into the retained position shown in FIGS. 2 and 3.

Figure 5:
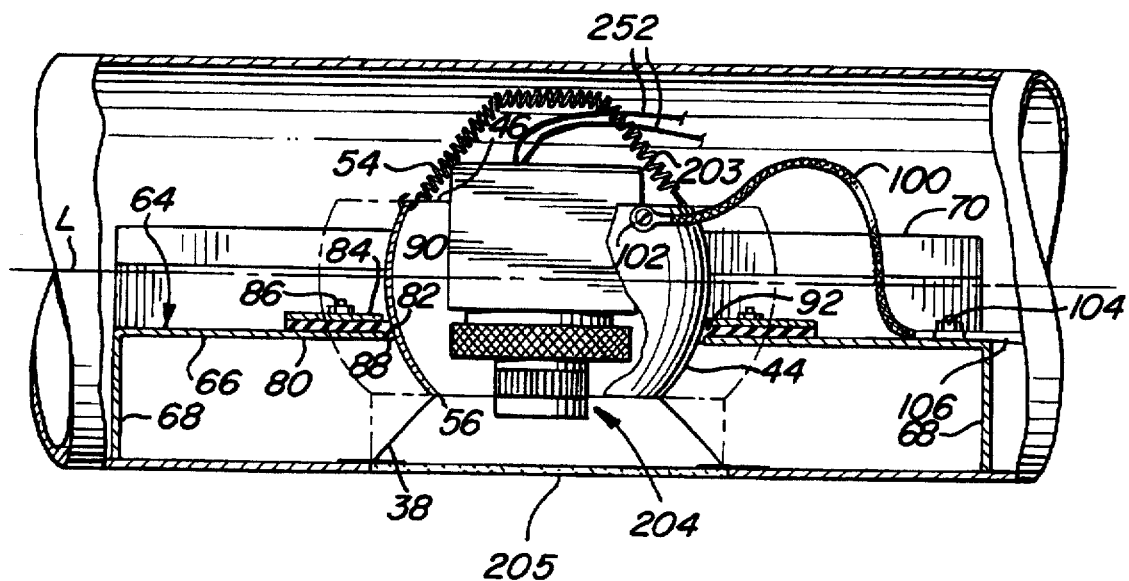
FIG. 5 is an enlarged fragmentary view of another portion of the lighting surveillance apparatus, broken away to show internal details.
Figure 6:
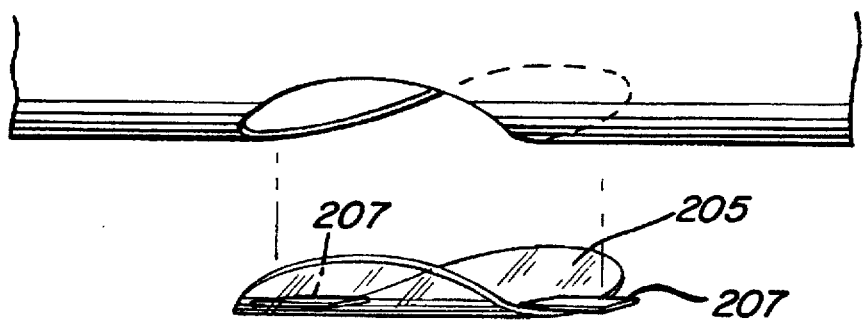
FIG. 6 is a partial perspective view illustrating an aperture and a window component employable for covering the aperture according to the preferred embodiment.

FIG. 5 illustrates a second portion 201 of the tubular unit 32 of FIG. 1 which encompasses the surveillance pod 31. This second portion 201 is identical in construction to that illustrated in FIGS. 2–4 with the exception that a miniature camera 203 having a focusable lens 204 is mounted in the housing 44 and has electrical leads 252 extending therefrom. The camera 203 may thus be aimed by rotation of the housing 44 just as the lamp 40 of FIGS. 2–4 may be so rotated and aimed.

The camera 203 may be, for example, a WAT-202 color CCD camera as available from WATEC, 5655 Lindero Canyon Road, Westlake Village, Calif. 91632. This camera 203 includes a ⅓-inch CCD image sensor, is powered by 12 volts DC, has a size specification of 42 mm×44 mm×53 mm, and weighs approximately 150 grams. It further includes a knurled focus ring 207 and an aperture control ring 209. The camera 203 is held in place by a retaining spring 54.

A lens or window 205 having two retention tabs 207 is provided and appropriately shaped to cover the aperture 38, and to conform to its cylindrical contour. The window 205 may be fabricated of plastic or glass. It may be "see-through," but preferably is appropriately colored such that camera 203 is more thoroughly concealed but still capable of transmitting an excellent image over appropriate cabling 28 to a video monitoring booth or other area. The cabling 28 includes a 120-volt AC coil cord for driving low voltage lamp transformers, as well as a coaxial video feed cable and a power cable to supply the 12-volt DC power supply of the camera 203. Such cabling can be combined in a single feed for more discrete applications.

Figure 7:
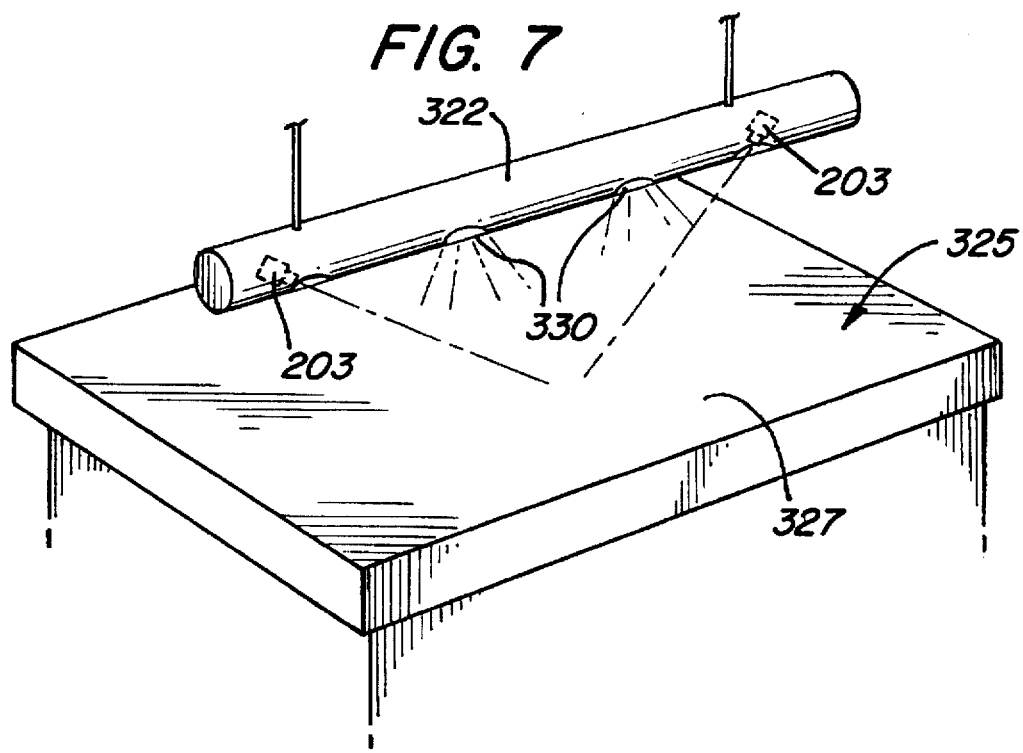
FIGS. 7 and 8 are perspective views illustrating alternative embodiments of the invention.

FIG. 7 illustrates an alternate embodiment for use with a generally rectangular table 325 such as, for example, a crap table or roulette table. In this embodiment a straight tubular light fixture 322 is positioned to overlie the table 325. Concealed cameras 203 are mounted at each end at a selected angle such that the pair of cameras together sweeps, i.e., provides the video imaging of, the entire surface 327 of the table 325. Suitably positioned lamps 330 provide illumination of the table surface 327. The tubular fixture 322 may, of course, be constructed in accordance with the principles and construction heretofore disclosed.

Figure 8:
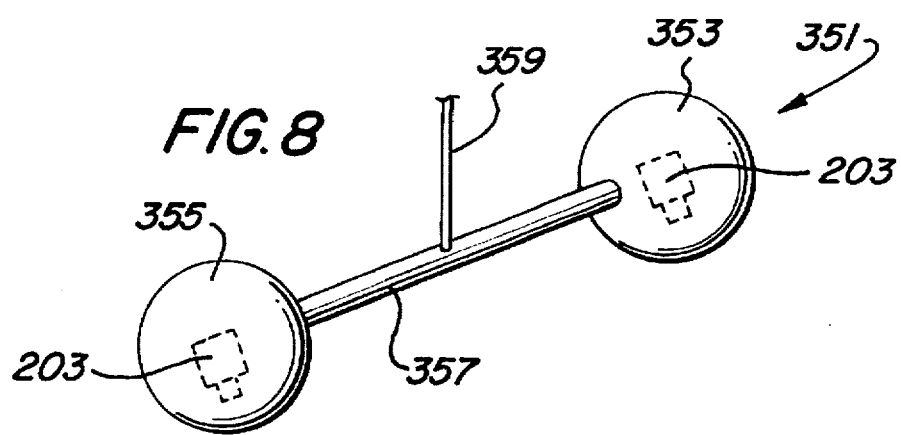

FIG. 8 illustrates an alternate embodiment comprising a dumbbell light fixture 321 having first and second globes 353, 355 affixed to opposite ends of a rod 357. The rod 357 may be brass and the globes may comprise glass covered with "flash gold" paint which conceals suitably-positioned cameras 203 while permitting them to "see through" the globes 353, 355.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. An apparatus comprising:

a fixture providing a surface to be observed;

a lamp fixture means suspended above said surface for providing illumination of said surface; and a camera means concealed in said lamp fixture means for generating a video signal containing information indicative of activity on said surface, wherein said lamp fixture means comprises a tubular member including:

a tubular wall and at least one aperture in the tubular wall intermediate opposite ends thereof, and wherein said tubular wall mounts a plurality of rotatable assemblies which are passed laterally through an aperture in said tubular wall to be enclosed selectively within the tubular member;

mounting means within the interior of the tubular member, adjacent the aperture, for locating a lamp holder within the interior of the tubular member in juxtaposition with the aperture such that light from a lamp assembly will be directed in a lateral direction through the aperture, the mounting means including a carrier member placed within the interior of the tubular member adjacent the aperture in the wall of the tubular member; and coupling means on the mounting means for selectively coupling the lamp holder with the mounting means in response to insertion of the lamp assembly laterally through the aperture into the interior of the tubular member and for selectively uncoupling the lamp holder from the mounting means in response to withdrawal of the lamp assembly laterally through the aperture out of the interior of the tubular member, the coupling means including a resilient member constructed of an elastomeric material and carried by the carrier member, the resilient member having a resiliently dilatable opening juxtaposed with the aperture in the wall of the tubular member for receiving the lamp holder to couple the lamp holder with the carrier member, the lamp holder including a housing having a diameter smaller than the aperture in the wall of the tubular member and greater than the resiliently dilatable opening in the resilient member such that the opening will dilate resiliently in response to insertion of the housing into the opening and retain the housing within the interior of the tubular member.

2. A lighting surveillance fixture having an elongate tubular member mounting a plurality of rotatable assemblies rotatable with respect to said tubular member, said tubular member being shaped and positioned to overlie a gaming apparatus, at least one of said rotatable assemblies comprising a lamp assembly, at least a second of said rotatable assemblies comprising a camera means positionable at an appropriate angle for observing action on the gaming apparatus, said tubular member comprising:

a tubular wall and at least one aperture in the tubular wall intermediate the opposite ends, and wherein each rotatable assembly and its corresponding aperture are relatively dimensioned such that the rotatable assembly may be passed laterally through the aperture into and out of the interior of the tubular member to be enclosed selectively within the tubular member;

mounting means within the interior of the tubular member, adjacent the aperture, for locating the lamp holder within the interior of the tubular member in juxtaposition with the aperture such that light from a lamp assembly will be directed in a lateral direction through the aperture, the mounting means including a carrier member placed within the interior of the tubular member adjacent the aperture in the wall of the tubular member; and coupling means on the mounting means for selectively coupling the lamp holder with the mounting means in response to insertion of the lamp assembly laterally through the aperture into the interior of the tubular member and for selectively uncoupling the lamp holder from the mounting means in response to withdrawal of the lamp assembly laterally through the aperture out of the interior of the tubular member, the coupling means including a resilient member constructed of an elastomeric material and carried by the carried member, the resilient member having a resiliently dilatable opening juxtaposed with the aperture in the wall of the tubular member for receiving the lamp holder to couple the lamp holder with the carrier member, the lamp holder including a housing having a diameter smaller than the aperture in the wall of the tubular member and greater than the resiliently dilatable opening in the resilient member such that the opening will dilate resiliently in response to insertion of the housing into the opening and retain the housing within the interior of the tubular member.

3. A lighting surveillance fixture having an elongate tubular member mounting a plurality of rotatable assemblies rotatable with respect to said tubular member, said tubular member being positioned adjacent a gaming apparatus, at least one of said rotatable assemblies comprising a lamp assembly, at least a second of said rotatable assemblies comprising a camera means positionable at an appropriate angle for observing action on the gaming apparatus, said tubular member comprising:

a tubular wall and at least one aperture in the tubular wall intermediate the opposite ends, and wherein each rotatable assembly and its corresponding aperture are relatively dimensioned such that the rotatable assembly may be passed laterally through the aperture into and out of the interior of the tubular member to be enclosed selectively within the tubular member;

mounting means within the interior of the tubular member, adjacent the aperture, for locating the lamp holder within the interior of the tubular member in juxtaposition with the aperture such that light from a lamp assembly will be directed in a lateral direction through the aperture, the mounting means including a carrier member placed within the interior of the tubular member adjacent the aperture in the wall of the tubular member; and coupling means on the mounting means for selectively coupling the lamp holder with the mounting means in response to insertion of the lamp assembly laterally through the aperture into the interior the tubular member and for selectively uncoupling the lamp holder from the mounting means in response to withdrawal of the lamp assembly laterally through the aperture out of the interior of the tubular member, the coupling means including a resilient member constructed of an elastomeric material and carried by the carrier member, the resilient member having a resiliently dilatable opening juxtaposed with the aperture in the wall of the tubular member for receiving the lamp holder to couple the lamp holder with the carrier member, the lamp holder including a housing having a diameter smaller than the aperture in the wall of the tubular member and greater than the resiliently dilatable opening in the resilient member such that the opening will dilate resiliently in response to insertion of the housing into the opening and retain the housing within the interior of the tubular member.

* * * * *